(12) United States Patent
Alvarez et al.

(10) Patent No.: US 7,859,574 B1
(45) Date of Patent: Dec. 28, 2010

(54) INTEGRATED CAMERA IMAGE SIGNAL PROCESSOR AND VIDEO ENCODER

(75) Inventors: José R. Alvarez, Sunnyvale, CA (US); Guy Cote, San Jose, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1282 days.

(21) Appl. No.: 11/410,729

(22) Filed: Apr. 25, 2006

Related U.S. Application Data (60) Provisional application No. 60/700,789, filed on Jul. 19, 2005.

(51) Int. Cl.
*H04N 5/228* (2006.01)
*H04N 5/225* (2006.01)
*G06K 9/36* (2006.01)
*G06K 9/46* (2006.01)

(52) U.S. Cl. .................. 348/222.1; 348/220.1; 382/239

(58) Field of Classification Search .............. 348/220.1, 348/222.1; 382/232, 235, 239
See application file for complete search history.

(56) References Cited

U.S. PATENT DOCUMENTS

| 5,412,427 A | * | 5/1995 | Rabbani et al. | .......... 348/394.1 |
| 5,502,485 A | * | 3/1996 | Suzuki | .................... 348/231.6 |
| 5,517,583 A | * | 5/1996 | Horiuchi et al. | ............. 382/239 |
| 5,550,595 A | * | 8/1996 | Hannah | ...................... 348/552 |
| 5,625,712 A | * | 4/1997 | Schoenzeit et al. | .......... 382/232 |
| 5,699,113 A | | 12/1997 | Ohiwa | ........................ 348/240 |
| 6,031,939 A | * | 2/2000 | Gilbert et al. | ............... 382/239 |
| 6,046,769 A | * | 4/2000 | Ikeda et al. | ............. 348/222.1 |
| 6,407,773 B1 | | 6/2002 | Ikeda et al. | ................. 348/222 |
| 6,498,621 B1 | | 12/2002 | Ikeda et al. | ................. 348/222 |
| 7,099,391 B2 | * | 8/2006 | Haneda | ................. 375/240.16 |
| 7,421,135 B2 | * | 9/2008 | Kondo et al. | ................. 382/239 |
| 7,489,344 B2 | * | 2/2009 | Fukuoka et al. | .......... 348/222.1 |
| 2002/0001035 A1 | * | 1/2002 | Haneda | ...................... 348/220 |
| 2006/0204115 A1 | * | 9/2006 | Burazerovic | ................ 382/239 |

* cited by examiner

*Primary Examiner*—David L Ometz
*Assistant Examiner*—Richard Bemben
(74) *Attorney, Agent, or Firm*—North Weber & Baugh LLP (57) ABSTRACT

An apparatus including a first circuit and a second circuit. The first circuit may be configured to perform image signal processing using encoding related information. The second circuit may be configured to encode image data using image signal processing related information, wherein said first circuit is further configured to pass said image signal processing related information to said second circuit and said second circuit is further configured to pass said encoding related information to said first circuit.

15 Claims, 8 Drawing Sheets

INTEGRATED CAMERA IMAGE SIGNAL PROCESSOR AND VIDEO ENCODER

This application claims the benefit of U.S. Provisional Application No. 60/700,789, filed Jul. 19, 2005 and is hereby incorporated by reference in its entirety.

FIELD OF THE INVENTION

The present invention relates to video processing generally and, more particularly, to a method and/or architecture for an integrated camera image signal processor and video encoder.

BACKGROUND OF THE INVENTION

Economies of scale in non-volatile storage and electronics in general are making it possible to create commercially attractive devices capable of high quality digital still picture photography and high quality digital video recording in the same mobile device. However, typical devices are either efficient at taking digital still pictures (Digital Still Cameras, DSC) or digital video streams (Digital Video Cameras, DVC), but not both.

SUMMARY OF THE INVENTION

The present invention concerns an apparatus including a first circuit and a second circuit. The first circuit may be configured to perform image signal processing using encoding related information. The second circuit may be configured to encode image data using image signal processing related information, wherein said first circuit is further configured to pass said image signal processing related information to said second circuit and said second circuit is further configured to pass said encoding related information to said first circuit.

The objects, features and advantages of the present invention include providing an integrated camera image signal processor (ISP) and video encoder that may (i) take advantage of processing and system synergies, (ii) provide an efficient digital still/video camera, (iii) provide a low cost digital still/video camera, (iv) provide improved performance over separate camera implementations and/or (v) provide improved image signal processing and encoding/decoding by exchanging information between image signal processor and CODEC functions.

BRIEF DESCRIPTION OF THE DRAWINGS

These and other objects, features and advantages of the present invention will be apparent from the following detailed description and the appended claims and drawings in which:

FIGS. 5(A-B) are flow diagrams illustrating an example of a zoom operation in accordance with a preferred embodiment of the present invention;

FIGS. 6(A-B) are flow diagrams illustrating an example of an auto exposure operation in accordance with a preferred embodiment of the present invention;

FIGS. 7(A-B) are flow diagrams illustrating an example of an auto focus operation in accordance with a preferred embodiment of the present invention; and FIGS. 8(A-B) are flow diagrams illustrating an example of a flash operation in accordance with a preferred embodiment of the present invention.

DETAILED DESCRIPTION OF THE PREFERRED EMBODIMENTS

A commercial mobile/portable system that is efficient as a digital still camera (DSC) and a digital video camera (DVC) involves the use of specific hardware/software. However, if the hardware/software systems for the DSC and the DVC are developed independently, allowing minimal interaction with each other, processing and system synergies between the two systems are not fully utilized. The present invention generally provides a system for taking advantage of such synergies to produce an efficient and low cost combination DSC/DVC with better performance than separate implementations.

Figure 1:
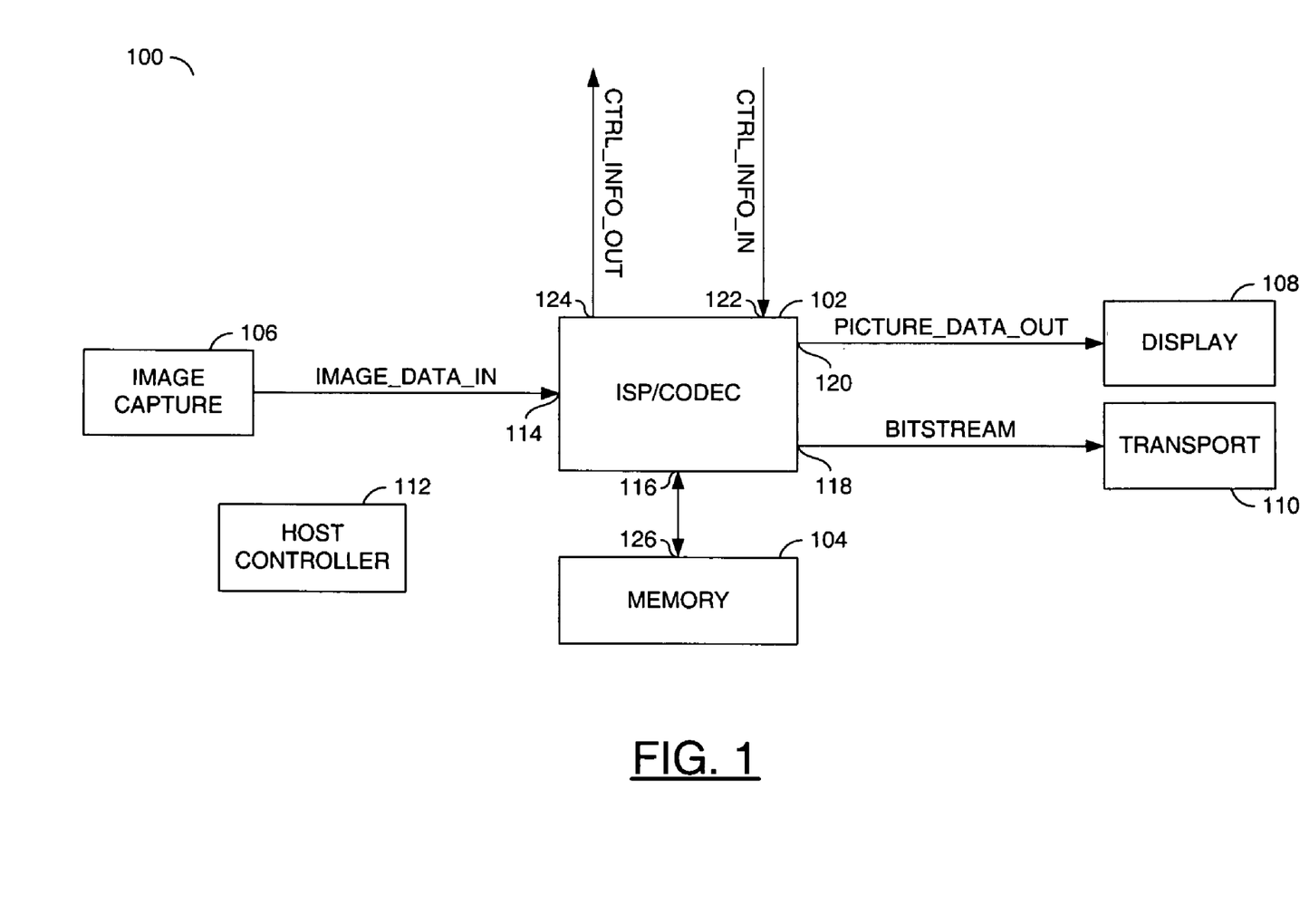
FIG. 1 is a block diagram illustrating an ISP/CODEC in accordance with the present invention.

Referring to FIG. 1, a block diagram is shown illustrating a still and video picture processing system 100 in accordance with the present invention. In one example, the system 100 may include a block (or circuit) 102, a block (or circuit) 104, a block (or circuit) 106, a block (or circuit) 108, a block (or circuit) 110 and a block (or circuit) 112. The block 102 may comprise an image signal (or sensor) processing (ISP) function (or circuit) and an encoding (or encoding/decoding (CODEC)) function (or circuit). In one example, the block 102 may be implemented as a single integrated circuit chip.

The block 104 may be implemented, in one example, as a memory. However, other appropriate storage media or devices may be implemented accordingly to meet the design criteria of a particular implementation. The block 106 may be implemented, in one example, as an image capture module. The block 108 may be implemented, in one example, as an image display module. The block 110 may be implemented, in one example, as a data transport module. The block 112 may be implemented, in one example, as a host controller.

In one example, the block 102 may have an input 114 that may receive a signal (e.g., IMAGE_DATA_IN), an input/output 116 that may be configured to connect the block 102 with the block 104, an output 118 that may present a signal (e.g., BITSTREAM), an output 120 that may present a signal (e.g., PICTURE_DATA_OUT), an input 122 that may receive a signal or signals (e.g., CTRL_INFO_IN) and an output 124 that may present a signal or signals (e.g., CTRL_INFO_OUT). The signal BITSTREAM may be implemented, in one example, as a compressed bitstream. In one example, the signal BITSTREAM may comprise data compressed in compliance with a standard or proprietary scheme (e.g., JPEG, MPEG, H.264, VC1, VC9, etc.). The signal IMAGE_DATA_IN may be implemented, in one example, as a still picture and/or video input signal. The signal PICTURE_DATA_OUT may be implemented, in one example, as a still picture and/or video output signal. The signal(s) CTRL_INFO_IN may comprise a number of types of information (e.g., capture control information, stabilization parameters, flash settings, images, active parameters, exposure settings, noise reduction settings, motion vectors and/or capture mode information). The signal(s) CTRL_INFO_OUT may comprise a number of types of data (e.g., capture parameters, images, rate control information, statistical information, exposure settings, correlation analysis, etc.).

The block 104 may have an input/output 126 that may be configured to couple (or interface) the block 104 to the block 102. The block 106 may be configured to capture image data, either still or moving for presentation to the block 102. For example, the block 106 may be implemented, in one example, as a lens and sensor (e.g., CCD, etc.). The block 108 may be implemented in one example, as any of a number of types of image display devices (e.g., CRT, LCD, plasma, etc.). The block 110 may be implemented as any of a number of transport and/or storage systems (e.g., CD, DVD, PVR, internet, satellite, broadcast, etc.). The block 112 may be configured to control various operations of the system 100. Although interconnections to the other blocks are not shown, the block 112 may be configured to provide control signals and receive control data from each or all of the various blocks of the system 100, as would be recognized by one of ordinary skill in the art.

External images may be prepared for input to the block 102 by the block 106. For example, the external images may be converted from an analog domain to a digital domain. In one example, the images may be converted by means of an image sensor and associated analog and digital processing circuits. In one example, the images may be converted by the block 106 from the analog domain into a format that is conducive to further digital processing. For example, the block 106 may be configured to convert analog process data into a two-dimensional sampling matrix. In one example, the process used may include a generally known technique of demosaicing (or color interpolation). Conventional techniques may be used for demosaicing.

The blocks 108 and 110 are generally illustrative of output processes. The block 108 may be configured to display decoded bit stream information (e.g., on a monitor). The block 110 may be configured to transport the encoded bit stream (e.g., as an MPEG-2 transport stream, etc.). The block 112 is generally configured to oversee the entire process and coordinate control and data processing among all the various modules in the system 100.

Figure 2:
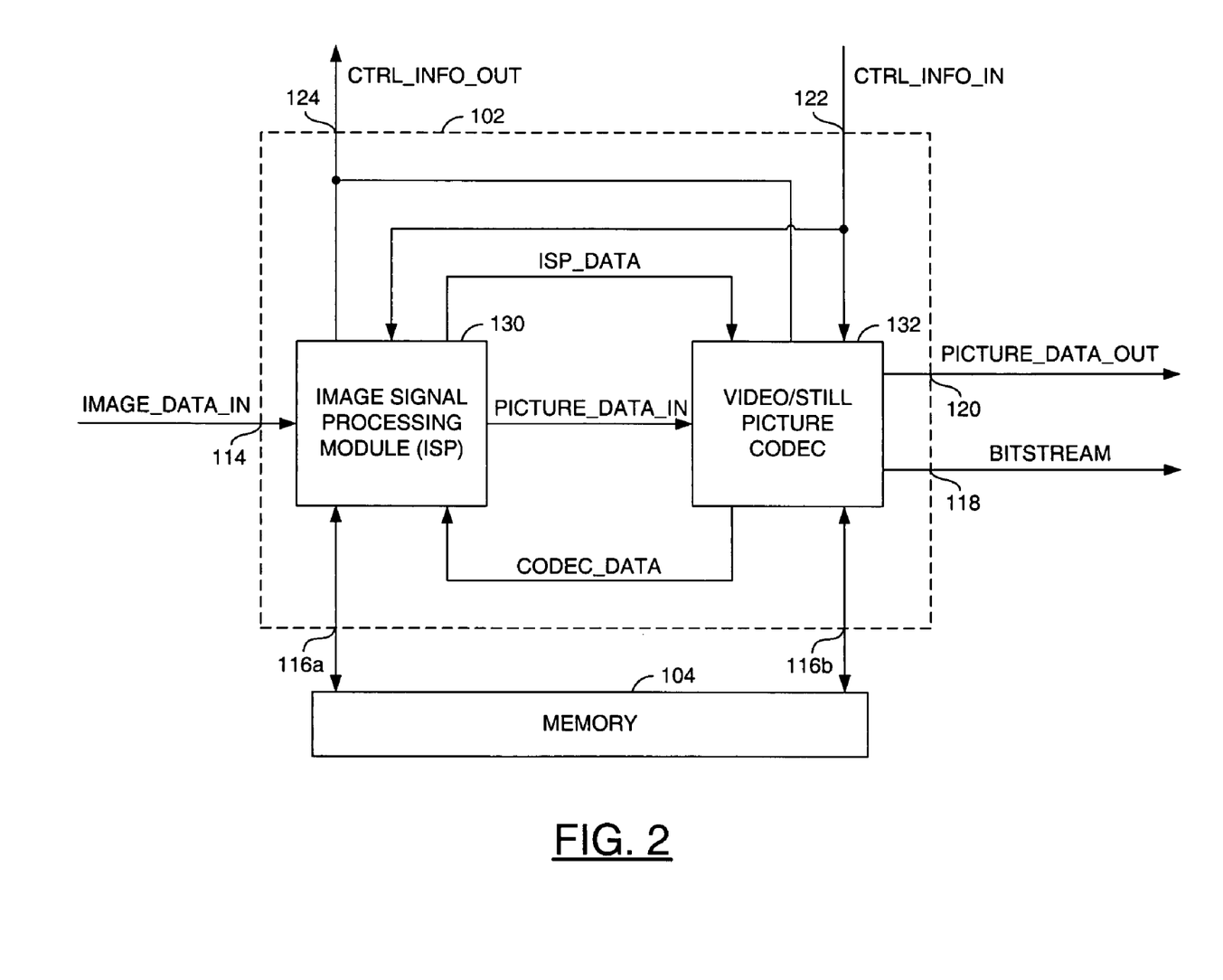
FIG. 2 is a more detailed block diagram illustrating connections between an image processing module and an encoding/decoding module of the ISP/CODEC of FIG. 1.

Referring to FIG. 2, a more detailed block diagram is shown illustrating an example implementation of the block 102 of FIG. 1. In one example, the block 102 may comprise a block (or circuit) 130 and a block (or circuit) 132. The block 130 may be implemented, in one example, as an image signal (or sensor) processing (ISP) module. In one example, the block 130 may be implemented using a digital signal processor (DSP). The block 132 may be implemented, in one example, as a video/still picture encoder/decoder (CODEC). In other examples, the block 132 may be implemented as a video/still picture encoder, a video encoder or a still picture encoder. In one example, the block 104 may be implemented as a multi-port memory. Although the block 104 is generally illustrated as a separate block from the block 102, one of skill in the relevant art would recognize that the function of the block 104 may be integrated with the block 102 and/or each of the blocks 130 and 132.

The block 130 may have a first input that may receive the signal IMAGE_DATA_IN, a first output that may present information (or data) as the signal CTRL_INFO_OUT, a second input that may receive the signal CTRL_INFO_IN, a second output that may present a signal (e.g., ISP_DATA), a third output that may present a signal (e.g., PICTURE_DATA_IN), a third input that may receive a signal (e.g., CODEC_DATA), and an input/output that may connect, in one example, to a first port of the block 104. The block 132 may have a first input that may receive the signal PICTURE_DATA_IN, a second input that may receive the signal ISP_DATA, a first output that may present information (or data) as the signal CTRL_INFO_OUT, a third input that may receive the signal CTRL_INFO_IN, a second output that may present the signal PICTURE_DATA_OUT, a third output that may present the signal BITSTREAM, a fourth output that may present the signal CODEC_DATA and an input/output that may be coupled, in one example, to a second port of the block 104.

The block 130 may be configured to convert raw image data to picture data amenable to compression. The block 130 may be configured to perform several processing steps for creating a picture that is both true to the image in the real world, and properly realized by the processing circuits, taking into account limitations of the technology used for the process. In one example, the limitations may include (i) finite dynamic ranges and temporal response in image sensor technology, (ii) inherent distortions in lenses, (iii) inherent noise in the capture process, (iv) errors and inconsistencies in transducers used to control exposure, focus and color representation and/or (v) processing limitations in current signal processing techniques.

Properly exposed and corrected picture data may be presented to the block 132 for further processing and compression. The block 132 may use hybrid entropy coding techniques such as MPEG, H.264, and/or JPEG to reduce the amount of picture data for storage and/or transmission. In one example, decoded (or decompressed) data may be presented for display on an external device. As used herein, the terms MPEG, H.264 and JPEG are used to generally refer to a variety of coding standards and/or proprietary schemes that may include, but are not limited to, MPEG-1, MPEG-2, MPEG-4, H.264, JPEG, JPEG-2000, etc.

Data (or image signal processing related information) generated from processes in the block 130 may be transmitted via the signal ISP_DATA to the block 132. Similarly, data (or coding/decoding related information) generated from processes in the block 132 may be transmitted via the signal CODEC_DATA to the block 130. In one example, the data may be transmitted using a communication protocol that allows for control and information to be interchanged between the modules. The information transmitted from the block 130 to the block 132 and from the block 132 to the block 130 is generally implemented for improving the quality of processing in both blocks (or systems). For example, the processes of the block 130 and the block 132 may be configured to modify (or adapt, change, optimize, etc.) operations based upon the data received from the block 132 and the block 130, respectively (described in more detail below in connection with FIGS. 5-8). The present invention may produce still pictures and video sequences of better quality than if the still pictures or the sequences had been processed independently by separate modules.

In general, processing improvements in the block 130 may be derived from data sent from the block 132. The improvements are generally independent of individual improvements in each of the processing steps involved in a normal image signal processor. Advancements in each processing operation in the block 130 may advance the performance of the system as a whole, but benefit may still be realized from data provided by the block 132 in accordance with the present invention. The data sent from the block 132 to the block 130 may comprise control data, statistical data and/or global and/or region-based spatio-temporal data derived from analysis of the image and video sequence data.

Similarly, video coding improvements by the block 132 may be realized by using data received from the block 130 in accordance with the present invention. The improvements are generally independent of individual advancements in each module in the block 132. The following sections generally describe examples of individual improvements that may be achieved by generating, transferring and using the data transferred between the block 130 and the block 132 in accordance with the present invention. The examples are presented as an illustration of, and not a limitation on, the improvements that may be realized using the present invention.

Figure 3:
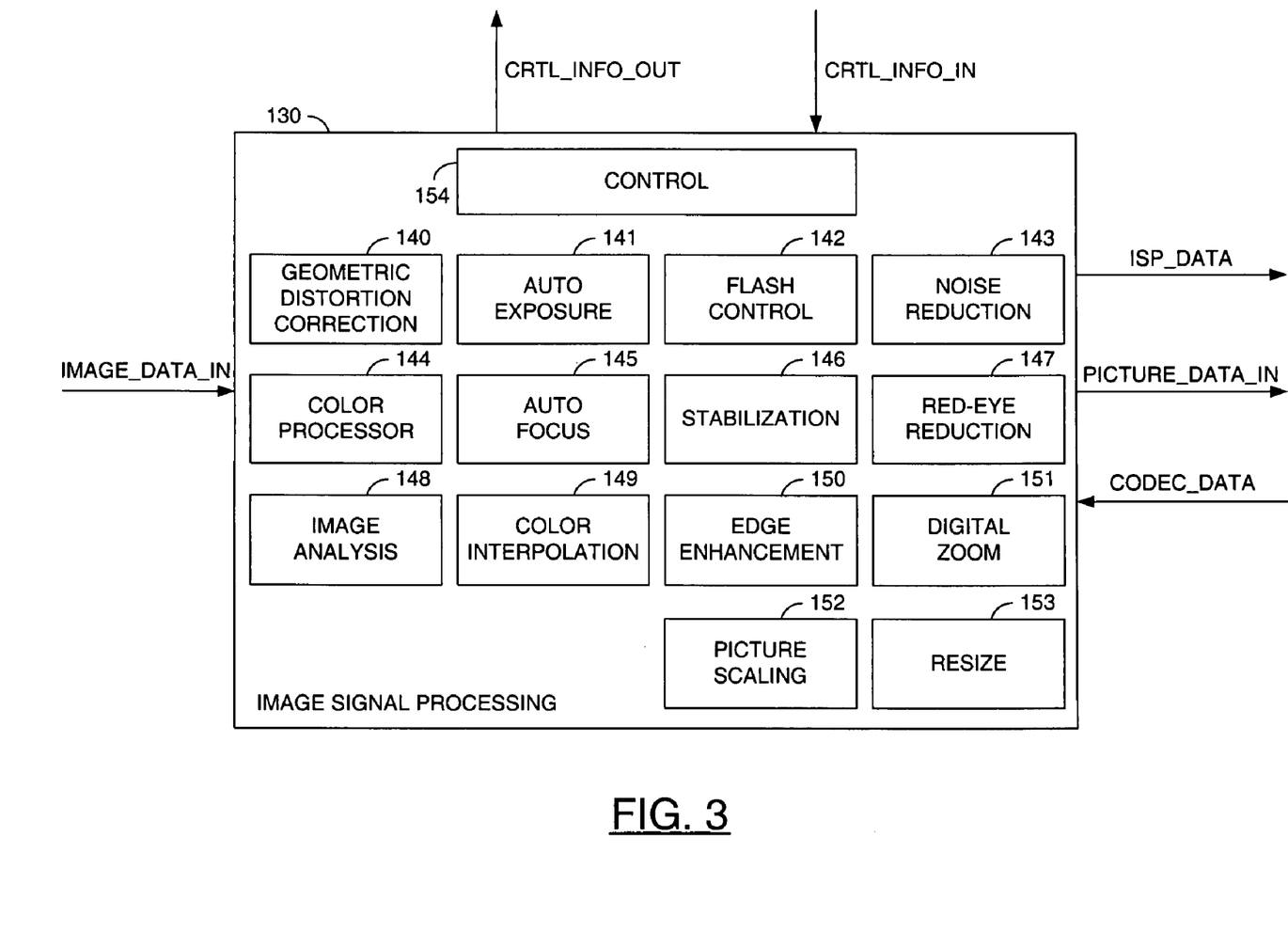
FIG. 3 is a block diagram illustrating functions of the image signal processing module of FIG. 2.

Referring to FIG. 3, a more detailed block diagram illustrating an example of the image signal (or image sensor) processing module 130 of FIG. 2 is shown. In one example, the block 130 may comprise a block (or circuit) 140, a block (or circuit) 141, a block (or circuit) 142, a block (or circuit) 143, a block (or circuit) 144, a block (or circuit) 145, a block (or circuit) 146, a block (or circuit) 147, a block (or circuit) 148, a block (or circuit 149, a block (or circuit) 150, a block (or circuit) 151, a block (or circuit) 152, a block (or circuit) 153 and a block (or circuit) 154. The block 140 may be implemented, in one example, as a geometric distortion correction block. The block 141 may be implemented, in one example, as an auto exposure module. The block 142 may be implemented, in one example, as a flash control module. The block 143 may be implemented, in one example, as a noise reduction module. The block 144 may be implemented, in one example, as a color processor module. The block 145 may be implemented, in one example, as a auto focus module. The block 146 may be implemented, in one example, as a stabilization module. The block 147 may be implemented, in one example, as a red-eye reduction module. The block 148 may be implemented, in one example, as an image analysis module. The block 149 may be implemented, in one example, as a color interpolation block. The block 150 may be implemented, in one example, as an edge enhancement block. The block 151 may be implemented, in one example, as a digital zoom block. The block 152 may be implemented, in one example, as a picture scaling block. The block 153 may be implemented, in one example, as a resizing block. The block 154 may be implemented, in one example, as a control block.

The blocks 140-154 may be configured to perform a series of operations on the captured image data (e.g., received via the signal IMAGE_DATA_IN) in order to improve quality and compression of the data. In one example, the blocks 140-154 may be implemented by modifying conventional techniques in accordance with the teaching of the present disclosure. The blocks 140-154 may be implemented, in one example, using a digital signal processor (DSP). For example, a specialized processor may be implemented containing dedicated hardware/software processing modules to achieve each operation illustrated in FIG. 3.

In general, real world images may be captured and converted from the analog domain to the digital domain. The block 140 may provide for correcting geometric distortions in the optical system of the image capture block 106 (e.g., distortion and shading compensation). The block 141 may provide automatic exposure functions to ensure that image illuminance/color ranges are properly captured by the imaging sensor of the block 106. For low light situations, the block 143 may provide noise reduction techniques that may be implemented to improve the signal-to-noise ratio (SNR) while the block 142 may provide automatic settings of the external flash that may be used to improve scene illumination. The block 144 may perform color processing (e.g., white balance, color correction, gamma correction, color conversion, etc.). The block 145 may be configured to automatically adjust a focal plane of the lens to ensure that the subject is in focus.

Under low lighting conditions with increased exposure time, the possibility of image blur may be reduced by the block 146 implementing an electronic image stabilization process configured to operate in concert with other processing modules in the block 130. Furthermore, in low light environments, the use of an external flash may cause a 'red-eye' condition in some subjects. The block 147 may implement automatic red-eye reduction techniques that may be included in the system 100.

The image and picture quality provided by the block 130 may be further improved through image analysis performed in the block 148, color interpolation processes performed by the block 149, edge enhancement processes implemented in the block 150 and/or digital zoom operations performed by the block 151. Image and picture size and/or aspect ratio may be adjusted by the block 152 and the block 153. In general, the operation of the blocks 140-153 may be controlled via the control block 154. The block 130 is generally capable of producing quality images and pictures that may be further processed by a still picture compression module and/or a video compression module. In one example, the still picture compression module and/or video compression module may be implemented external to the block 130. For example, a still picture encoder (or encoder/decoder) process and/or an advanced video encoder (AVC), or encoder/decoder (CODEC) process may reside in the block 132.

The signal ISP_DATA may be generated dynamically as the block 130 is optimizing image capture for picture quality improvements. The signal CODEC_DATA sent from the block 132 to the block 130 may comprise control and statistics data and employ a mutually agreed upon transmission protocol that includes specific commands to adjust parameters of the block 130.

As the pictures are encoded in real time, the block 130 may adjust operations in order to improve performance using statistical and image characteristics data transmitted back from the block 132 (described in more detail below). For example, the block 130 may be configured to modify processes based on data received from the block 132 in order to improve picture quality. In general, all of the image signal processing techniques implemented in the block 130 may benefit from real-time data gathered by the block 132 since image signal processing is generally not optimized to process sequences of pictures but rather still images.

The control information received by the block 130 from the block 132 may be used not only for improving image processing, but also to improve coding efficiency. The ISP settings in the block 130 may be deliberately modified to affect both the still image and moving picture coding processes of the block 132. Furthermore, many of the techniques described herein may be tuned by a user of the system. For example, an operator may set parameters to achieve a particular quality level in still picture/video capture situations.

The block 141 may be configured to provide automatic exposure processing for the block 130. By examining the information from light sensors, the block 141 may set exposure time and lens aperture to optimize image capture by the image sensor device. The sensitivity of the sensor is commonly expressed in terms of traditional film sensitivity as dictated by ISO. A properly exposed picture generally takes advantage of the dynamic range of the sensor. In some cases, the processing provided by the block 130 may optimize the dynamic range so that particular areas of the picture are better exposed. For example, particular areas may be deemed more important (e.g., people's faces in shadowed areas).

The block 142 may provide automatic flash control for the block 130. Under low lighting situations, the block 142 may automatically determine the need for external flash illumination given the chosen (or derived) exposure parameters (e.g., aperture, shutter speed, ISO sensitivity). The block 142 may control the external flash via the signal CTRL_INFO_OUT.

The block 143 may provide noise reduction for the block 130. Under low lighting conditions or high ISO equivalent capture settings, the possibility of random noise generally increases. The block 143 may reduce random noise to improve picture quality. In typical DSC configurations there is limited use of temporal domain information to reduce noise. Lowering the amount of random noise in pictures increases perceived quality by allowing better compression. Lowering the amount of random noise also allows better capture parameters to be used for each picture (e.g., higher shutter speeds and smaller apertures).

The block 145 may provide automatic focus control/processing for the block 130. In one example, a normal operation of the automatic focus control may be to hunt for a proper focus point. Such hunting behavior may be modified based on information (e.g., motion vector, etc.) provided by the block 132 in accordance with the present invention. For example, a technique for focusing a camera may implement an auto-focusing mechanism that refocuses the image until a greatest amount of high frequencies are obtained. For example, the point where the most high frequencies are obtained may be associated with the perfect focus of the point because the image no longer looks blurry. The present invention may use statistics about where a high number of edges are present in an image to control the auto-focusing mechanism. For example, the auto-focusing mechanism may be adjusted to focus on a small portion of the image containing edges to improve the performance of the auto focus.

In another example, the block 145 may analyze a set of areas of the picture to determine the proper focal length for sharp image capture. In general, the block 130 may be configured to identify the main subject of the picture especially when the aperture is wide (i.e., the depth-of-field is shallow) in order to properly bring into focus the important areas of the picture.

The block 146 may be configured to provide image stabilization. Under low lighting situations or large zoom magnification, the possibility of camera motion (e.g., shake) and, therefore, blurry pictures increases. Large zoom factors generally employ larger apertures and therefore create shallow depth-of-field conditions that call for sharp, continuous focusing. The block 154 generally manages the conflicting focusing demands and modifies the efficacy of the stabilization techniques to improve exposure and/or focus mechanisms.

The block 147 may be configured to perform red-eye reduction for the block 130. Under low lighting conditions, some subjects will reflect flash illumination from the back of the eye (e.g., the retina) therefore causing the red-eye effect. The block 147 may be configured to determine such situations and adapt/correct in the areas where red-eye is most likely to occur. In some implementations, the flash may be pulsed rapidly prior to final picture capture so as to narrow the pupil aperture of a subject.

The block 148 may be configured to derive picture characteristics representing spatial and temporal statistics data (e.g., averages, standard deviations, probability distributions, histograms, etc.). The block 148 may be further configured to collect feature-based image characteristics (e.g., object texture, color, edges, motion, etc.) and integrate the characteristics into regions of interest based on a combination of the picture features.

The majority of image sensors generate more spatial information than allowed by the physical number of photosensitive receptors by sampling each color component with different resolution. For example, a subsampling scheme referred to as Bayer pattern sampling may be used. In the Bayer pattern sampling scheme, the red and blue components are sampled once every four spatial positions, while the green component is sampled twice every four spatial positions. The Bayer pattern sampling scheme uses a two-dimensional sampling pattern illustrated in the following example array:

$$G\ B$$
$$R\ G$$

The color interpolation block 149 may be used to generate a complete signal for all color components at all spatial positions through digital interpolation to produce the same number of samples for all the red, green and blue components.

The edge enhancement block 150 may be used to increase the perceived resolution of sampled images. For example, the block 150 may detect the location and strength of object edges in two-dimensions and increase the contrast of the edges with respect to the surrounding picture detail, therefore creating the appearance of more resolution.

The blocks 151, 152 and 153 are generally related to each other in that the blocks 151, 152 and 153 may change the resolution of the pictures based upon predefined (or programmable) criteria. The digital zoom block 151 may be used in place of an optical zoom mechanism. The optical zoom is performed at the lens and, although effective, is expensive to realize because of the cost of the lens. Instead, digital upscaling techniques may be used to increase the resolution of an area of interest, therefore creating the same effect as the optical zoom. The digital zoom block 151 may emulate the analog lens operation of zoom-in and zoom-out at a rate of change determined by the user. In a digital zoom operation the size of the picture remains the same.

The picture scaling block 152 may be implemented similarly to the digital zoom block 151, except that the picture scaling block 152 generally operates on the entire picture, while the digital zoom generally operates on an area of interest. Scaling may be used in cases where the size of the picture needs to be modified in the frame of the original picture (e.g., to compose several pictures in one frame). Furthermore, picture scaling may be used to both increase and decrease the resolution on the input images in scaling ratios determined by the application and not necessarily directly by the user.

A resizing operation may be implemented that is a special case of picture scaling. The total number of samples used to represent the image are changed using digital resampling techniques (as opposed to the block 151 and the block 152 which generally preserve the original frame resolution). The block 153 may implement the resizing operation in a faster more efficient manner than the blocks 151 and 152.

Figure 4:
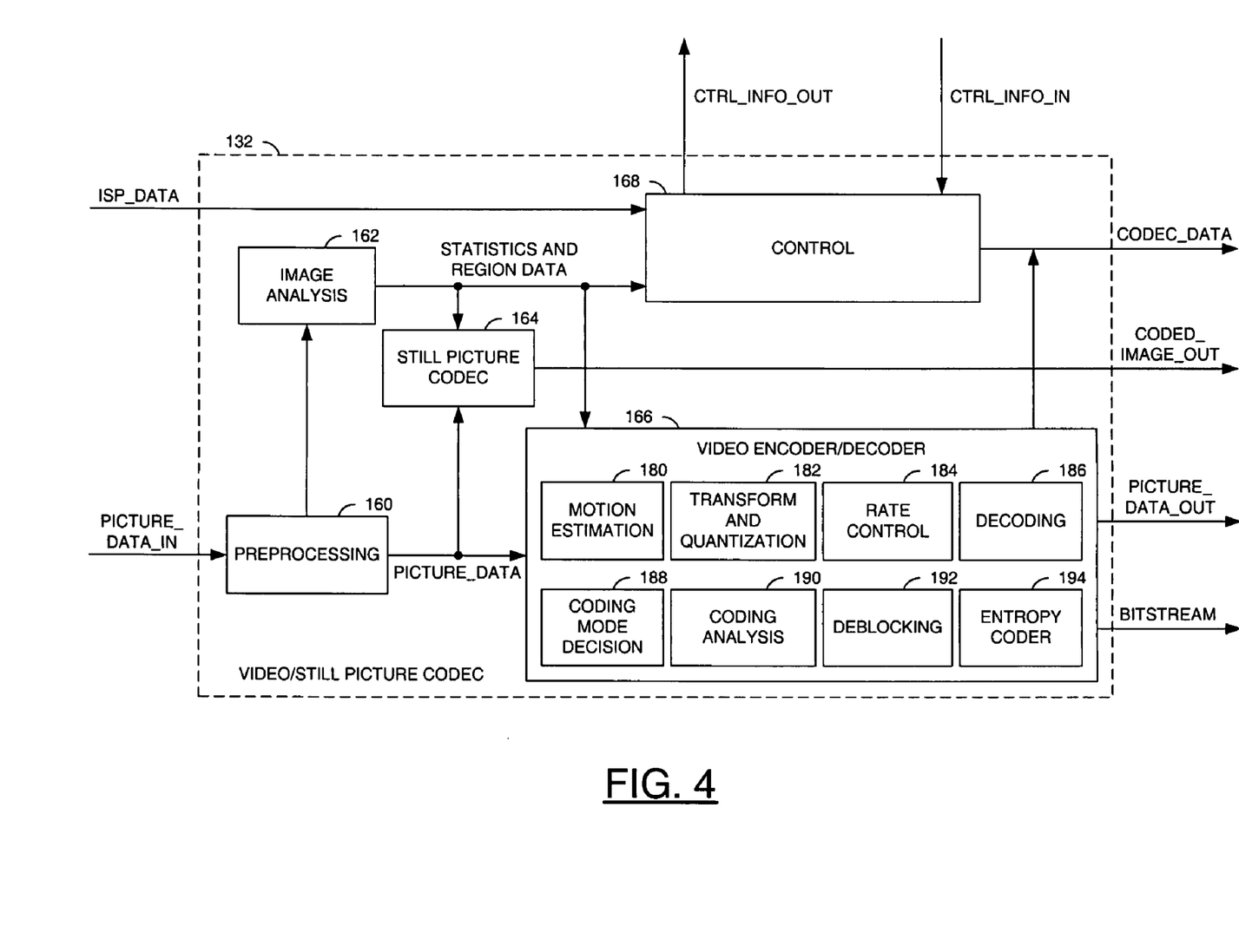
FIG. 4 is a block diagram illustrating functions of the coder/decoder module of FIG. 2.

Referring to FIG. 4, a more detailed block diagram is shown illustrating an example of a video/still picture CODEC 132 implemented in accordance with one embodiment of the present invention. In one example, the block 132 may comprise a block (or circuit) 160, a block (or circuit) 162, a block (or circuit) 164, a block (or circuit) 166 and a block (or circuit) 168. The block 160 may be implemented in one example, as a pre-processing module. The block 162 may be implemented, in one example, as an image analysis block. The block 164 may be implemented, in one example, as a still picture encoder/decoder (CODEC). The block 166 may be implemented in one example, as a video encoder/decoder (CODEC). In one example, the block 166 may be implemented as an H.264 compliant CODEC. However, the block 166 may be compliant with other standards and/or proprietary compression schemes. The block 168 may be implemented, in one example, as a control block.

In one example, the signal PICTURE_DATA_IN may be presented to an input of the block 160. The block 160 may have a first output that may present a signal to an input of the block 162 and a second output that may present a signal (e.g., PICTURE_DATA) to an input of the block 164 and an input of the block 166. The information sent to the block 162 may include, but is not limited to, luminance picture data, chrominance picture data, low frequency and high frequency information on luminance and chrominance, object textures, object colors, object edges, temporal differences between pictures and motion estimated block vectors between pictures.

The block 162 may be configured to generate statistics and region data. The statistics and region data may be presented to a second input of the block 164, a second input of the block 166 and a first input of the block 168. The block 168 is implicitly connected to all of the blocks 160-166 in the block 132. The block 168 may be implemented as a top-level controller that manages operating modes (dictated by a user), quality requirements, and performance requirements. For example, the block 168 may be configured to manage rate control processes that may change the behavior of the block 166. The block 168 sets parameters and issues instructions for coordination of operations of the other blocks.

The block 166 may have a first output that may present the signal PICTURE_DATA_OUT, a second output that may present the signal BITSTREAM and a third output that may present information via the signal CODEC_DATA. In general, data that is not 'picture', 'image', 'bitstream', or any other image related data is processed by the system control block 168. The block 168 may have a second input that may receive the signal ISP_DATA, a third input that may receive the signal CTRL_INFO_IN, a first output that may present the signal CTRL_INFO_OUT and a second output that may present information via the signal CODEC_DATA. The block 168 may be configured to make decisions regarding system behavior. The block 168 generally executes the processes described below in connection with FIGS. 5-8.

Image data proceeding from the block 130 is generally preprocessed by the block 160 to improve compression quality (e.g., cropping, spatial scaling, color conversion and noise reduction). The image analysis module 162 is generally configured to use original, and preprocessed data to produce a series of global (picture-based) and regional (specific area-based) statistics that represent image sequence characteristics.

The still picture encoder-decoder block 164 is generally configured to code still pictures. The still picture coding process is always part of a DSC since picture data compression is used to achieve efficient storage and transmission. In general, the still picture coding process 164 is included in the block 132 to illustrate that there is a unified coding approach. The image signal processing analysis data received from the block 130 (e.g., via the signal ISP_DATA) may be used to improve still picture quality. The process of using ISP analysis data to improve still picture quality is included in the coding parameter optimization phase illustrated in the flowcharts of FIGS. 5B, 6B and 7B.

In a conventional DSC, still picture coding is an external process to the ISP and greatly influenced by the capture efficiency/processing of the ISP. Typically, still picture compression is achieved by JPEG coding. By allowing both CODEC analysis data and ISP analysis data to be fed into the still picture coding process, the present invention provides the ability to perceptually change the quantization parameters of selected areas of the picture.

The block 166 generally comprises several modules configured to process picture sequences in space and time to produce high quality compressed video bit streams. In one example, the block 166 may comprise a block (or circuit) 180, a block (or circuit) 182, a block (or circuit) 184, a block (or circuit) 186, a block (or circuit) 188, a block (or circuit) 190, a block (or circuit) 192 and a block (or circuit) 194. The block 180 may be implemented, in one example, as a motion estimation block. The block 182 may be implemented, in one example, as a transform and quantization block. The block 184 may be implemented, in one example, as a rate control block. The block 186 may be implemented, in one example, as a decoding block. The block 188 may be implemented, in one example, as a coding mode decision block. The block 190 may be implemented, in one example as a coding analysis block. The block 192 may be implemented, in one example, as a deblocking filter block. The block 194 may be implemented, in one example, as an entropy coder block. The blocks 180-194 may be implemented using conventional circuits and/or techniques modified in accordance with the teachings of the present disclosure. In one example, the block 186 may be omitted.

The blocks 180-194 are generally illustrative of processing modules in a hybrid entropy coding encoder. In general, the block 168 may be implemented to coordinate the functioning of the individual modules 180-194. Functioning of the encoder generally comprises control and data path connections configured to achieve compliance with a particular coding standard (or proprietary scheme).

In general, all of the modules 180-194 are influenced by the rate control block 184 since the block 184 keeps track of bit rate and quality requirements for particular operating modes set by higher level processes (e.g., user specifications and capture modes) controlled by the block 168. The motion estimation block 180 and the coding mode decision block 188 generally determine the most efficient encoding for the predicted data. The data may be predicted in the spatial direction (e.g., intra prediction) or the temporal direction (e.g., inter prediction). The transform and quantization block 182 is generally configured to convert the residual data (e.g., difference between actual and predicted data) into a domain most suitable for compression (e.g., the process of discarding perceptually irrelevant data). The quantization step is important for compression efficiency and one of the major controls for bit rate and quality constrains managed by the rate control block 184.

The decoding block 186 may be implemented as a standalone feature. The decoding block 186 generally duplicates the behavior of a decoder at the end of the transmission channel in order to avoid drift. Display functions are generally associated with the block 186 since in many cases it is desirable to monitor the encoded bit stream.

The deblocking block 192 is generically placed in the diagram to indicate the inclusion of some filtering during the compression process, whether inside the coding loop or outside of the coding loop. Compression quality is generally improved by the use of deblocking circuits.

The coding analysis block 190 may be configured to gather information about the coding process. The information gathered by the block 190 may be sent to the block 130 via the signal CODEC_DATA to improve processing. The type of data transmitted to the block 130 is outlined below.

In general, the block 132 may be configured to use data received from the block 130 via the signal ISP_DATA to change the behavior of the motion estimation (e.g., search window management, prediction modes, weighted prediction, etc.), quantization, rate control (e.g., to meet specific quality vs. bit rate targets), and noise reduction modules. In the system depicted in FIG. 2, each of the blocks 130 and 132 is capable of generating analysis data relating to respective internal functioning and to the nature of the images processed. The image analysis module 156 generates the data and sends it forward to the block 132 via the signal ISP_DATA. The block 130 may be configured to generate data for use by the block 132 as described below. For example, information on lens distortion may be used to adjust coding parameters for optimal compression in areas that have less optical fidelity. Quantization may be coarser at the edges of the pictures where the distortion is more pronounced.

Hybrid entropy coding systems are partly based on detecting changes of motion in sequences. Therefore, there is always a need to estimate motion between pictures. Typical motion estimation (ME) engines detect changes based on some measure of correlation such as mean-squared error (MSE) or mean absolute error (MAE). These techniques tend to fail in situations where there is no real motion, but just changes in picture characteristics. Such cases may include sudden flashes of light (e.g., when a camera attempts to illuminate a subject for proper exposure); fade in and fade out (e.g., when exposure changes in order to produce the optimum exposure). In such cases, block 130 provides information about the current state of exposure and focus settings to block 132 so that motion estimation engines are set to operate under optimal conditions. For example, proper use of skip, direct and weighted prediction modes.

In state-of-the-art CODECs like H.264, there are inter-frame prediction modes and intra-frame prediction modes. Selecting the appropriate mode for efficient coding is a process that involves multiple tries of intra and inter coding modes to find the best performance; or a-priori knowledge of the material to select only the appropriate coding modes. Although the coding mode selection process is not strictly done in the ME module, the coding mode selection process is included in this section because in one form or another selecting the correct intra or inter mode involves the analysis of displacement of picture data in either the spatial domain (intra modes) or the temporal domain (inter modes).

Quantization is the process of converting the transform coefficients to fixed point representation. As with any quantization process, small coefficients will be quantized to zero value if the quantization parameter is large (coarse quantization parameter) and therefore, those coefficients can be regarded as non-critical for picture coding fidelity. However, there are many cases where particular picture features are important for achieving good fidelity and therefore should not be quantized coarsely, but rather with a finer (smaller) quantization step. Knowledge of image and sequence characteristics help in determining those areas that should be quantized more carefully than other to achieve good picture fidelity.

Achieving acceptable fidelity and high compression is a common optimization problem since fidelity and high compression constitute conflicting goals. In particular, excellent image quality may lead to low (inefficient) compression, while high (efficient) compression tends to produce poor image quality. The rate control block 184 is generally configured to provide a good compromise between picture quality and compression efficiency. A-priori knowledge of picture and sequence characteristics can help manage the optimization task described above.

Pictures devoid of random noise are easier to encode because there is less irrelevant high frequency information. However, the unabridged application of noise reduction techniques to images in both the spatial and temporal domain can lead to soft and flat pictures that do not represent real scenery. Data regarding the capture process may be obtained in order to make better decisions as to the amount of noise reduction needed and the coding modes needed for faithful reproduction at all target bit rates.

The block 132 may be configured to send adjustments to exposure parameters of the block 130 via the signal CODEC_DATA based on compression efficiency and quality performance. The exposure settings may be adjusted so that certain areas of the picture are optimally encoded. The block 132 may identify overly dark and overly bright areas of the picture for better exposure and adjust the quantization approach so that those areas are assigned enough bits for proper coding. The picture gain of the block 130 may be adjusted via the signal CODEC_DATA to improve motion estimation performance and better rate control when the block 130 is in a dynamic configuration phase (e.g., auto exposure, auto focus, etc.). Fast changes in the picture gain due to auto exposure 'hunting' may be minimized under very low bit rate conditions (e.g., so as not to overwhelm the encoding process).

The block 132 may be configured to send adjustments to the focus parameters of the block 130 via the signal CODEC_DATA based on compression efficiency and quality performance. For example, focus may be slightly de-tuned under extremely low bit rate requirements in order to improve compression performance. Focus dynamics of the block 130 may be adjusted during the auto focus phase in order to improve motion estimation performance and rate control (e.g., sudden focus changes may be minimized in order to reduce sudden bit production during encoding). Adjustments to the noise reduction process of the block 130 may be sent via the signal CODEC_DATA based on compression efficiency and quality performance. For example, under low lighting conditions and low motion, the block 132 may send commands for increased noise reduction since performance will not be affected by high motion.

Global statistics data may be obtained by the preprocessing module 160 after analyzing each picture as a whole (e.g., with no particular area of each picture having more importance than another). Region-based statistics data may be obtained by classifying areas of the picture with certain feature characteristics such as amount of low/high frequency texture, amount of edges, amount of motion detected, amount of moving edges, type and amount of a specific color, etc.

In contrast with control data sent via the signal CODEC_DATA to the block 130, the raw global and region-based statistics data may be sent as information to be processed and acted upon at the discretion of the respective image signal processing procedures of the block 130 (e.g., no declarative command actions are associated with the data). For example, size and strengths of regions in the picture classified according to a set of features (e.g., texture, edges, motion, color, etc.) may be provided to the block 130 to evaluate the amount and relevance of featured regions in the picture in both the spatial and temporal domains. Information regarding areas of low/high texture in the picture may be sent via the signal CODEC_DATA to the block 130. The block 130 may use the texture information for auto-focus processing by evaluating the amount of low/high frequency in the picture as a result of changes of focal length by the focusing circuits.

Information regarding areas of the picture with strong edge components may be sent from the block 132 to the block 130 via the signal CODEC_DATA. The block 130 uses the edge information for auto-focusing whereby the amount of edges in the picture increase as the picture comes into focus. This mechanism may be used along with motion information to determine the quality of auto-focus data. Furthermore, edge information can be used in demosaicing procedures that rely on edge information to adapt the Bayer conversion process.

The block 132 may send information regarding areas of low/high motion in the picture, including moving edges, to the block 130 via the signal CODEC_DATA. The block 130 may use the motion information for auto-focusing (e.g., to determine quiescent areas of the picture upon which to reliably focus), auto-exposure (e.g., by increasing exposure time when pictures are non-moving) and noise reduction (e.g., by applying stronger noise reduction to non-moving areas).

The block 132 may send further information concerning areas of the picture featuring a specific color to the block 130 via the signal CODEC_DATA. In one example, the block 132 may be configured to operate in the YUV domain to facilitate detection of areas of specific colors. The color information may be used to identify human faces to help reduce red-eye effects (which also depend upon identification of red areas of the picture). The block 130 may use the color information to reduce the red-eye effects when using a flash.

In addition to the control data and global picture and region-based statistics, the block 132 may be configured to send statistics derived from analysis of the encoding process via the signal CODEC_DATA using a mutually agreed protocol for data interchange. For example, motion vector information may be transmitted to the block 130 to implement/improve image stabilization processes. The block 130 may use the motion vector information to obtain detailed motion in specific areas of the picture for improved motion-adaptive procedures under low lighting conditions (e.g., auto exposure, auto focus, noise reduction, image stabilization). In addition to the motion vector information, block distortion information may be sent to the block 130. For example, the block distortion information may include an indication of the coding fidelity at a given bit rate. Distortion per block at the edges of the picture analyzed in the temporal domain may be an indication of fixed lens aberrations that may be corrected by the block 130.

In addition to sending the above information to the block 130 via the signal CODEC_DATA, information generated in the block 132 may also be sent to the block 164. The signal CODEC_DATA generally represents all information gathered by block 132 in the process of preprocessing and encoding the moving picture data. In one example, the block 164 may be implemented as a JPEG or JPEG2000 still picture codec. The signal CODEC_DATA may contain information to improve performance of block 130 as indicated on the left side of the flow charts in FIGS. 5-8. For example, in FIG. 8, when the flash is active, the block 130 may use information in the signal CODEC_DATA to change the flash intensity and duration.

In one example, the block 164 may be implemented as part of the block 132. However, in other implementations the block 164 may be implemented as part of the block 130, or as a separate system altogether. In one example, the block 164 may be a separate system implemented with a general DSP Processor.

The block 132 may be configured to send the global picture and region-based statistics data comprising texture information, edge information, motion information and color information to the block 164. Texture information concerning areas of low/high texture in the picture may be used by the block 164 to apply perceptual coding to those areas. For example, areas of high frequency texture may be coded according to a target bit rate; while areas of low frequency texture may be coded with a fine quantization step in order to avoid banding artifacts. Edge information regarding areas of the picture with strong edge components may be used to improve perceptual coding. For example, areas with a strong edge component may be coded with a fine quantization step in order to avoid edge artifacts like ringing and mosquito noise.

Motion information concerning areas of low/high motion in the picture, including moving edges may be used to improve perceptual coding. For example, areas of low motion may be coded with a fine quantization step in order to reproduce them faithfully. On the other hand, areas of high motion are presumably blurred and, depending on the ISP parameters received, may be coded with very few bits if over/under exposed or adversely affected by low shutter speeds. Color information about areas of the picture featuring a specific color may be used to identify human faces for perceptual coding. The quantization step may be much lower in these areas in order to reproduce faces more faithfully.

In addition to the global picture and region-based statistics, the block 132 may be configured to send statistics derived from analysis of the encoding process to the block 164 to steer perceptual processing performed by the block 164. In one example, the statistics sent to the block 164 may include a number of bits coded per block, block distortion, block coded residual variance and number of quantized transform coefficients with zero value per picture. The number of bits coded per block may be sent to the block 164 to give an indication of coding efficiency per picture. The block 164 may collect the number of bits coded per block information for every picture in order to improve internal processing procedures and also to make decisions regarding the effect of the internal processing procedures on compression efficiency.

The block distortion information may be sent to the block 164 as an indication of the coding fidelity at a given bit rate; together with the number of bits per block, the block distortion information may be used to evaluate the total efficiency of the encoding process in terms of the compromises between distortion and rate. For example, the block 132 generally uses the number of bits per block and block distortion values to tune rate-control processes. The block coded residual variance data are an indication of coding efficiency in both the spatial and temporal domains as a result of coding decisions in the block 132 due to motion estimation and quantization. The block 164 may use the block coded residual variance data to adapt internal processing methods by allocating less bits to areas where the residual is low (e.g., assuming that the areas where the residual is low can be coded efficiently with a higher quantization step). The decision to allocate less bits to areas where the residual is low may be used together with indications of texture and motion in order to properly allocate bits to regions that are more likely to produce artifacts at higher compression ratios. The data regarding the number of quantized transform coefficients with zero value per picture are an indication of compression efficiency with respect to picture/sequence complexity. The information may be used by the block 164 in the same manner as the number of bits per block.

Figure 5:
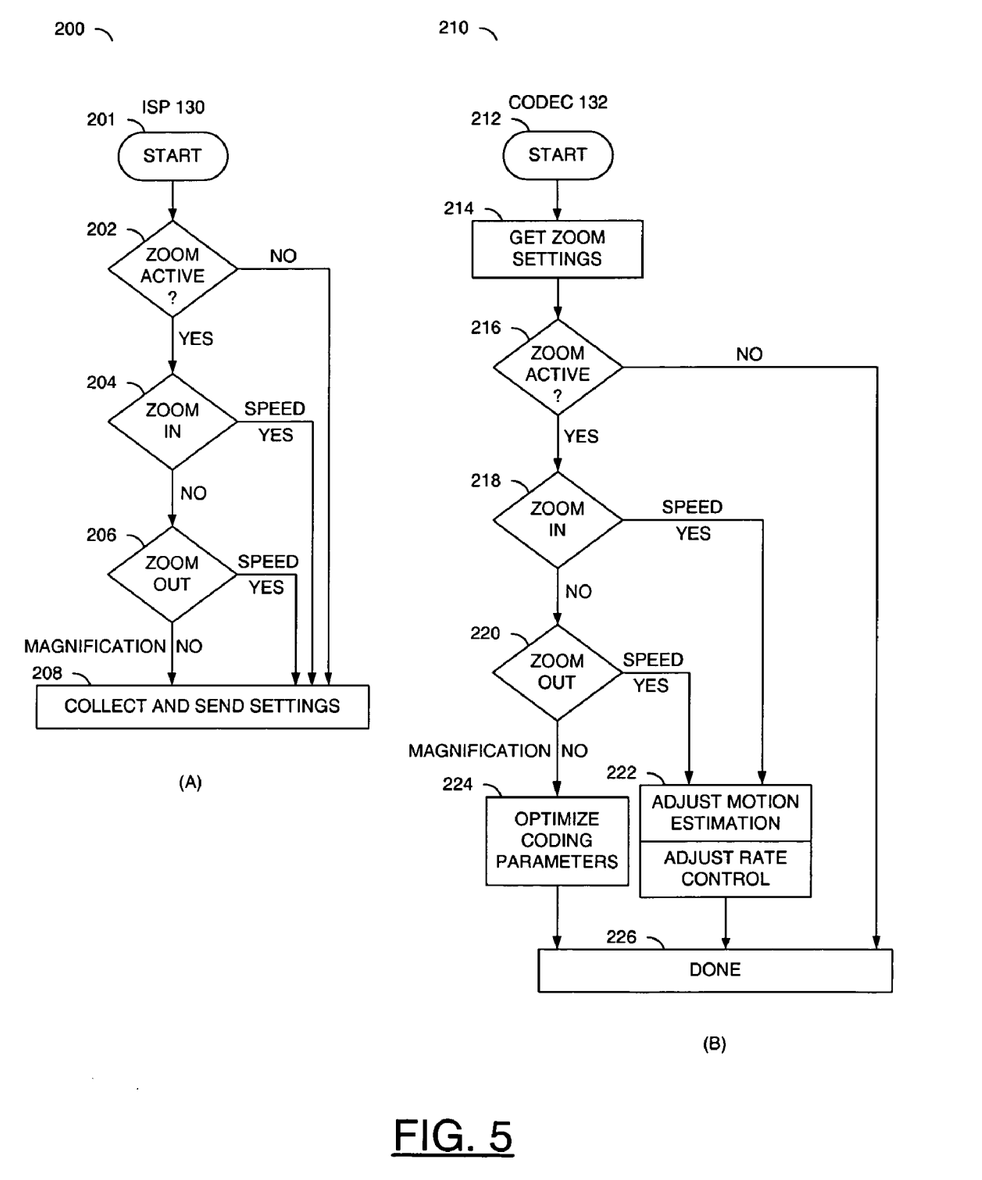

Referring to FIGS. 5(A-B), flow diagrams are shown illustrating an example of a zoom operation of the block 130 (FIG. 5A) and the block 132 (FIG. 5B) of FIG. 2. In one example, a zoom procedure 200 for the block 130 may comprise a state 201, a state 202, a state 204, a state 206 and a state 208. The zoom procedure 200 for the block 130 may start in the state 201 and move to the state 202. The state 202 may comprise a decision state. In the state 202, the process 200 may determine whether a zoom function is active. When the zoom function is active, the process 200 may move to the state 204. If the zoom function is not active, the process 200 may move to the state 208.

In the state 204, the process 200 may determine whether the zoom operation is zooming in (e.g., enlarging or magnifying an object of interest). The operation of zooming in may also be referred to as the zoom moving in. When the zoom operation is not zooming in, the process 200 may transition to the state 206. When the zoom operation is zooming in, the process 200 may determine the speed (e.g., rate of change of magnification) at which the zoom is moving in and transition to the state 208. In the state 206, the process 200 may determine whether the zoom operation is zooming out (e.g., reducing an apparent size or de-magnifying an object of interest). The operation of zooming out may also be referred to as the zoom moving out. When the zoom operation is not zooming out, the process 200 may collect information regarding the current magnification and transition to the state 208. When the zoom operation is zooming out, the process 200 may determine a speed (e.g., rate of change of the magnification) at which the zoom is moving out and transition to the state 208. In the state 208, the information (e.g., magnification and/or rate of change of the magnification) may be collected and sent to the block 132.

A zoom procedure 210 for the block 132 may comprise a state 212, a state 214, a state 216, a state 218, a state 220, a state 222, a state 224 and a state 226. The state 212 may be implemented as a start state. The state 214 may be implemented as a zoom setting collection state. The state 216 may be implemented as a decision state. The state 218 may be implemented as a decision state. The state 220 may be implemented as a decision state. The state 222, may be implemented as an adjustment state. The state 224 may be implemented as an optimization state. The state 226 may be implemented as a completion state.

The process 210 may begin in the state 212 and transition to the state 214. In the state 214, the process 210 generally obtains zoom settings. When the zoom setting have been obtained, the process 210 generally transitions to the state 216. In the state 216, the process 210 determines whether the zoom is active. When the zoom is not active, the process 210 generally transitions to the state 226 and terminates. When the zoom is active, the process 210 generally transitions to the state 218.

In the state 218, the process 210 determines whether the zoom operation is zooming in. When the zoom operation is not zooming in, the process 210 generally transitions to the state 220. When the zoom operation is zooming in, the process 210 generally determines the speed (e.g., rate of change of magnification) at which the zoom is moving in and transitions to the state 222. In the state 222, the process 210 generally adjusts motion estimation and/or rate control parameters and transitions to the state 226 for completion.

In the state 220, the process 210 generally determines whether the zoom operation is zooming out. When the zoom operation is not zooming out, the process 210 generally determines the magnification and transitions to the state 224. When the zoom operation is zooming out, the process 210 generally determines the speed (e.g., rate of change of magnification) at which the zoom is moving out and transitions to the state 222. In the state 224, the process 210 generally optimizes coding parameters based on the magnification determined and transitions to the state 226.

The block 132 may be configured to modify motion estimation (ME) and mode decision processes specifically for zooming-in or zooming-out portions of the input sequence. Under fast zoom situations, the block 132 may be configured to adjust rate control processes for efficient coding. When zooming is in a quiescent state, picture parameters may be optimized for a current magnification factor. For example, under high magnification unstable camera hold may be a problem and therefore rate control should be set to ignore quick changes. The process represented by the optimize coding parameters block 224 generally involves non-dynamic changes to the processes indicated in adjacent adjust motion estimation and adjust rate control blocks 222.

Figure 6:
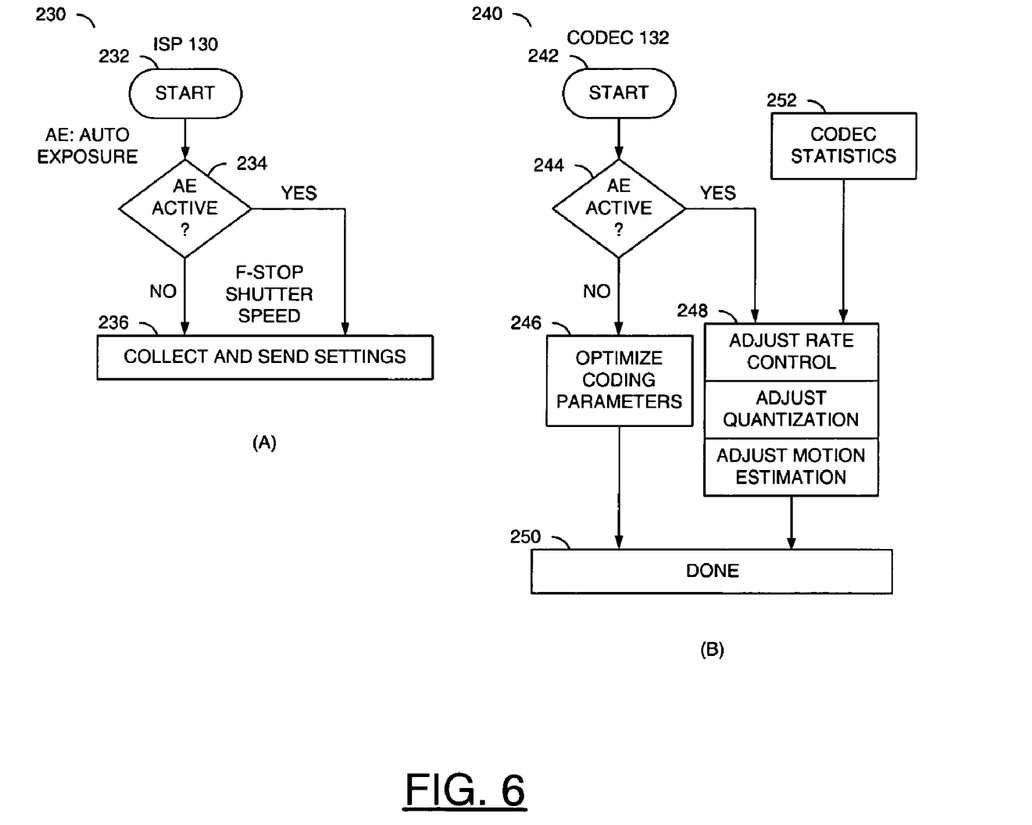

Referring to FIGS. 6(A-B), flow diagrams are shown illustrating an example of an auto exposure process for the block 130 (FIG. 6A) and the block 132 (FIG. 6B). The process 230 may comprise state 232, a decision state 234 and a state 236. In the state 232, the block 130 generally begins the auto exposure procedure and transitions to the state 234. In the state 234, the process 230 determines whether or not the auto exposure mode is active. If the auto exposure mode is active, the process 230 transitions to the state 236 and collects information regarding F-stop and shutter speed. When the auto exposure mode is not active, the process 230 generally transitions to the state 236 and no data is collected or sent. During the auto exposure procedure 240, the block 132 generally enters the state 242 to begin the procedure for auto exposure. The process 240 generally transitions to the state 244. In the state 244, the process 240 determines whether the automatic exposure mode is active. If the automatic exposure mode is not active, the process 240 generally transitions to the state 246. If the auto exposure mode is active, the process 244 generally transitions to the state 248. In the state 246, the process 240 generally optimizes coding parameters and transitions to the state 252. In the state 248, the process 240 generally adjusts rate control parameters, adjusts quantization parameters and adjusts motion estimation parameters. The adjustments to the rate control, quantization and motion estimation may be performed taking into account statistics received from the CODEC (e.g., the block 152). Once the adjustments of rate control, quantization and motion estimation have been completed, the process 240 may transition to the state 250 for completion.

When the block 130 adjusts exposure settings dynamically, the block 132 may be configured to adjust quantization and rate control for efficient coding. Change in global exposure settings may be handled with weighted prediction modes by the block 132 therefore improving coding rates. Dynamic range changes to selected areas of the picture may be coded with more/less bits depending on the relevance of the regions in terms of psycho-visual measures (e.g., more important areas will be allocated more bits). Both data from the block 130 and statistics from the block 132 may be used to improve the final coding efficiency of the output bit streams. In general, the optimized coding parameters block 246 generally represents non-dynamic changes to the processes indicated in the adjacent rate control, quantization and ME blocks 248.

Figure 7:
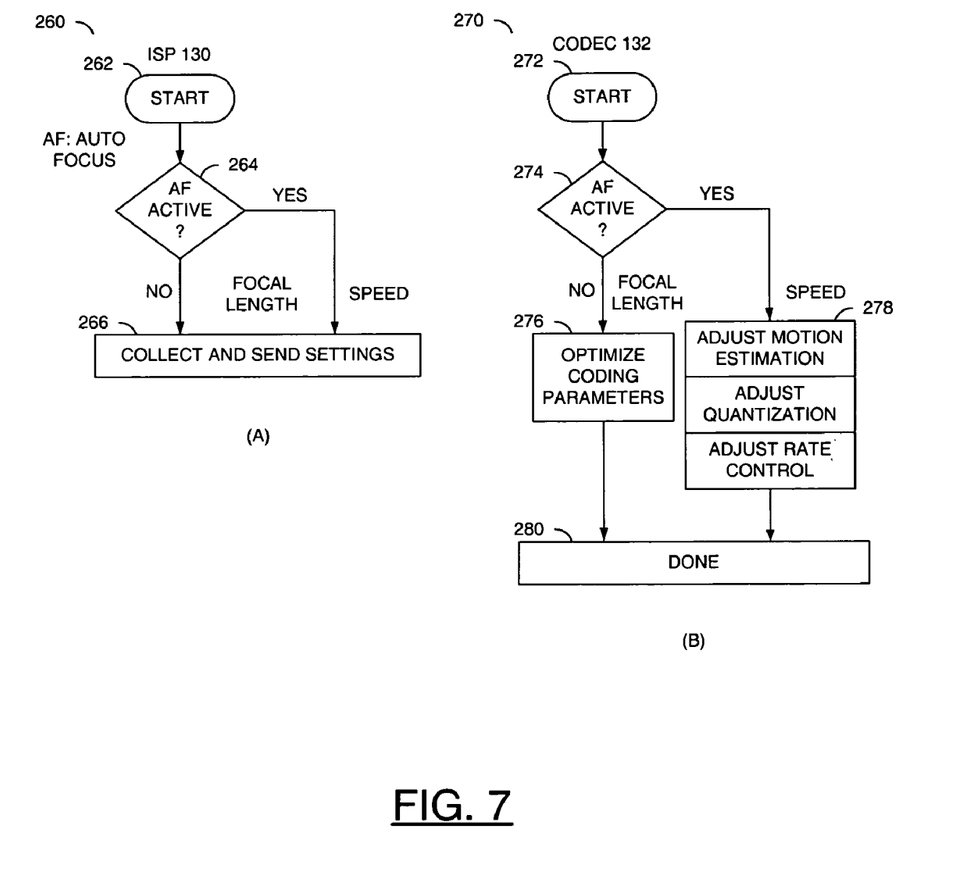

Referring to FIGS. 7(A-B), flow diagrams are shown illustrating an example of an auto focus process for the block 130 (FIG. 7A) and the block 132 (FIG. 7B). The process 260 may comprise state 262, a decision state 264 and a state 266. In the state 262, the block 130 generally begins the auto focus procedure and transitions to the state 264. In the state 264, the process 260 determines whether or not the auto focus mode is active. When the auto focus mode is active, the process 260 transitions to the state 266 and collects information regarding focus speed. When the auto focus mode is not active, the process 260 generally transitions to the state 266 and collects information regarding focal length.

During the auto focus procedure, the block 132 generally performs a process 270. The process 270 generally comprises a state 272, a state 274, a state 276, a state 278 and a state 280. The process 270 generally entered the state 272 to begin the procedure for auto focus. The process 270 generally transitions to the state 274. In the state 274, the process 270 determines whether the automatic focus mode is active. When the automatic focus mode is not active, the process 270 generally transitions to the state 276. When the auto focus mode is active, the process 270 generally transitions to the state 278.

In the state 276, the process 270 generally optimizes coding parameters and transitions to the state 280. In one example, focal length information may be used to optimize the coding parameters. In the state 278, the process 270 generally adjusts rate control parameters, adjusts quantization parameters and adjusts motion estimation parameters. The adjustments to the rate control, quantization and motion estimation may be performed taking into account speed information (e.g., rate of change of focus). Once the adjustments of rate control, quantization and motion estimation have been completed, the process 270 may transition to the state 280 for completion.

During focusing adjustments, the block 130 may be configured to change focal length dynamically while the block 132 may be configured to adjust rate control for optimal quality (e.g., using lower bit rates to save bits for later more complex scenes). During the focusing operation the block 132 generally uses low bit rates since the video is not yet optimized for recording (blurry). The block 132 may be configured to modify motion estimation processes to work more efficiently during focal changes. The optimize coding parameters block 276 generally represents non-dynamic changes to the processes indicated in the adjacent ME, Quantization and Rate Control blocks 278.

Figure 8:
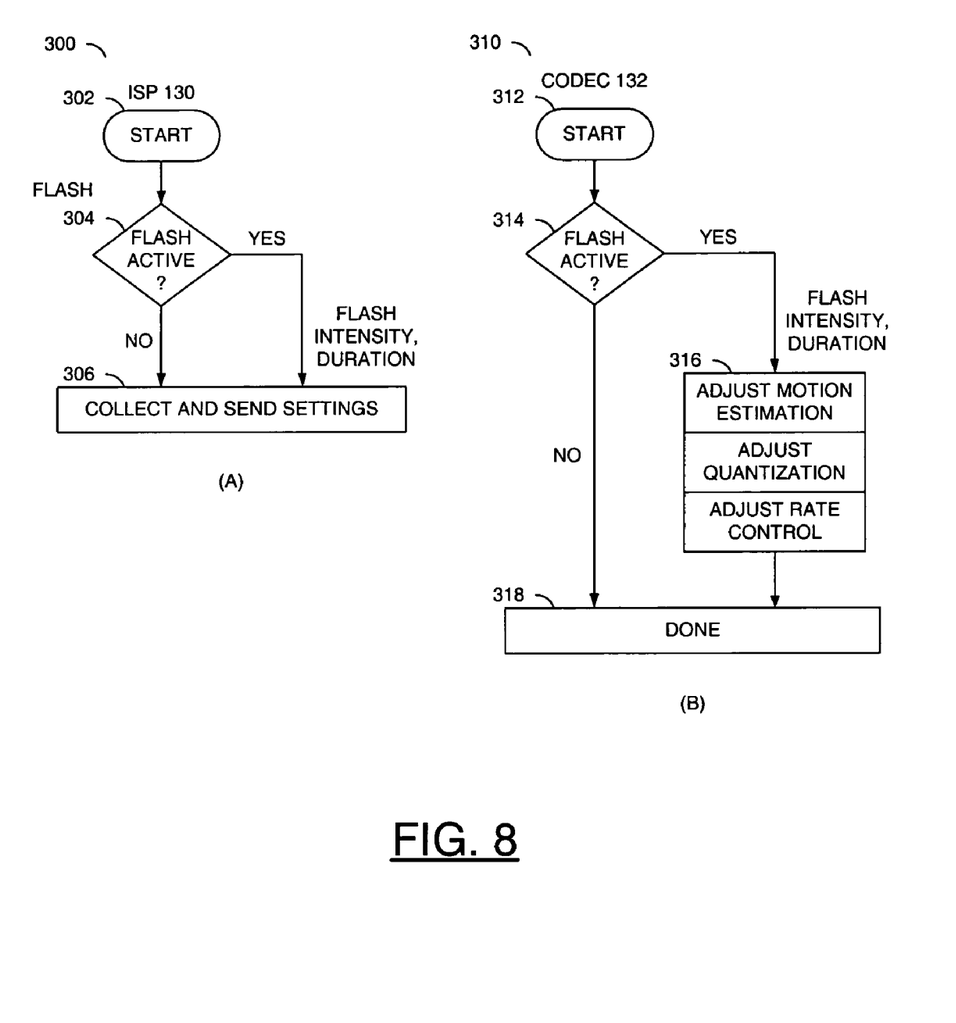

Referring to FIGS. 8(A-B), flow diagrams are shown illustrating an example of flash process 300 for the block 130 (FIG. 8A) and a flash process 310 for the block 132 (FIG. 8B). The process 300 may comprise state 302, a decision state 304 and a state 306. In the state 302, the block 130 generally begins the flash procedure and transitions to the state 304. In the state 304, the process 300 determines whether or not the flash is active. When the flash is active, the process 300 transitions to the state 306 and collects information regarding flash intensity and duration. When the flash is not active, the process 300 generally transitions to the state 306 and no data is collected or sent.

The process 310 generally comprises a state 312, a state 314, a state 316, and a state 318. During the flash procedure 310, the block 132 generally enters the state 312 to begin the procedure for flash compensation. The process 310 generally transitions to the state 314. In the state 314, the process 310 determines whether the flash is active. When the flash is active, the process 310 generally transitions to the state 316. When the flash is not active, the process 310 generally transitions to the state 318.

In the state 316, the process 310 generally adjusts rate control parameters, adjusts quantization parameters and adjusts motion estimation parameters. The adjustments to the rate control, quantization and motion estimation parameters may be performed taking into account information about flash intensity an/or duration. Once the adjustments of the rate control, quantization and motion estimation parameters have been completed, the process 310 may transition to the state 318 for completion.

Sudden flash pictures can overwhelm a common video encoder. By transmitting flash intensity and duration information from the block 130 to the block 132, the block 132 may adjust motion estimation and rate control to deal with the sudden change in pictures. For example, at the flash transitions, the block 132 may insert new Intra prediction frames. In H.264 coding, a Long Term Picture may also be generated at the flash occurrence.

As would be apparent to those skilled in the relevant art(s), the signals illustrated in FIGS. 1-4 represent logical data flows. The logical data flows are generally representative of physical data transferred between the respective blocks by, for example, address, data, and control signals and/or busses. The system 100 may be implemented in hardware, software or a combination of hardware and software according to the teachings of the present disclosure, as would be apparent to those skilled in the relevant art(s).

The functions performed by the flow diagrams of FIGS. 5-8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to receive an input signal and perform image signal processing on said input signal using encoding related information;
a second circuit configured to encode image data using image signal processing related information, wherein said first circuit is further configured to pass (i) said image data and (ii) said image signal processing related information to said second circuit and said second circuit is further configured to pass said encoding related information to said first circuit and present a picture data output signal; and
wherein said encoding related information comprises commands configured to modify one or more processing parameters of said first circuit.

2. The apparatus according to claim 1, wherein said first and said second circuits are integrated in a single integrated circuit.

3. The apparatus according to claim 1, wherein said second circuit comprises one or more circuits selected from the group consisting of a video picture encoder circuit, a still picture encoder circuit, a video picture encoder/decoder (CODEC) circuit and a still picture encoder/decoder (CODEC).

4. The apparatus according to claim 3, wherein said video picture CODEC comprises an H.264 complaint CODEC.

5. The apparatus according to claim 3, wherein said still picture CODEC comprises a JPEG compliant CODEC.

6. The apparatus according to claim 1, wherein said first circuit comprises an image signal processing (ISP) circuit.

7. The apparatus according to claim 1, wherein said first circuit comprises a digital signal processor (DSP).

8. The apparatus according to claim 1, wherein said first circuit and said second circuit are further configured to (i) receive one or more first control signals from one or more external devices and (ii) present one or more second control signals to said one or more external devices.

9. The apparatus according to claim 1, further comprising:
an image capture circuit couple to said first circuit; and
an image display device couple to said second circuit.

10. The apparatus according to claim 1, wherein said second circuit is further configured to present a compressed bitstream.

11. The apparatus according to claim 1, wherein said one or more processing parameters of said first circuit comprises one or more parameters selected from the group consisting of exposure parameters, gain parameters, focus parameters, flash parameters and noise reduction parameters.

12. The apparatus according to claim 1, wherein said encoding related information comprises global picture and region-related statistics.

13. The apparatus to claim 12, wherein said global picture and region-related statistics comprise one or more types of data selected from the group consisting of size and strengths of regions, texture information, edge information, motion information and color information.

14. The apparatus according to claim 1, wherein said encoding related information comprises statistics derived from analysis of an encoding process.

15. The apparatus according to claim 14, wherein said statistics derived from analysis of said encoding process comprise one or more types of data selected from the group consisting of motion vector information and block distortion information.

* * * * *